(12) United States Patent
Kunishige

(10) Patent No.: US 8,842,200 B2
(45) Date of Patent: Sep. 23, 2014

(54) IMAGING DEVICE AND IMAGING METHOD CAPABLE OF BRIGHT SPOT PROCESSING

(75) Inventor: Keiji Kunishige, Hachioji (JP)

(73) Assignee: Olympus Imaging Corp., Tokyo (JP)

(*) Notice: Subject to any disclaimer, the term of this patent is extended or adjusted under 35 U.S.C. 154(b) by 241 days.

(21) Appl. No.: 13/289,305

(22) Filed: Nov. 4, 2011

(65) Prior Publication Data

US 2012/0113296 A1 May 10, 2012

(30) Foreign Application Priority Data

Nov. 8, 2010 (JP) ................................. 2010-249860

(51) Int. Cl.
*H04N 5/262* (2006.01)
*H04N 9/74* (2006.01)
*H04N 5/232* (2006.01)

(52) U.S. Cl.
CPC ......... *H04N 5/23293* (2013.01); *H04N 5/2621* (2013.01); *H04N 5/23245* (2013.01)
USPC .......................................... 348/239; 348/578

(58) Field of Classification Search
None
See application file for complete search history.

(56) References Cited

U.S. PATENT DOCUMENTS 5,751,864 A * 5/1998 Moriwake et al. ............ 382/276
6,546,187 B1 * 4/2003 Miyazaki et al. ............. 386/224
2001/0013869 A1 * 8/2001 Nozawa ........................ 345/473
2002/0105589 A1 * 8/2002 Brandenberger et al. ..... 348/360
2009/0103830 A1 * 4/2009 Weng ............................ 382/274
2010/0157101 A1 * 6/2010 Yamamoto et al. ........... 348/239

FOREIGN PATENT DOCUMENTS

| JP | 06-030373 | 2/1994 |
| JP | 2003-058880 | 2/2003 |
| JP | 2004-032799 | 1/2004 |
| JP | 2009-177508 | 8/2009 |
| JP | 2010-021795 | 1/2010 |
| JP | 2010-119051 | 5/2010 |

OTHER PUBLICATIONS

Office Action for corresponding Japanese Patent Application Serial No. 2010-249860, mailed May 13, 2014 (4 pgs.).

* cited by examiner

*Primary Examiner* — Justin P Misleh
(74) *Attorney, Agent, or Firm* — John C. Pokotylo; Straub & Pokotylo

(57) ABSTRACT

An imaging device, capable of generating a movie or a live view that has a part that has been subjected to image processing within at least a frame, includes an imaging section for converting a subject image into electrical signals and outputting image data in live view, a bright spot region setting section for setting a bright spot detection region for the image data, a bright spot detection section for detecting bright spots within the bright spot detection region set by the bright spot setting section, a bright spot processing section for performing bright spot processing at the bright spot positions detected by the bright spot detection section, and an image output section for outputting an image that has been subjected to bright spot processing by the bright spot processing detection for display or for storage.

17 Claims, 14 Drawing Sheets

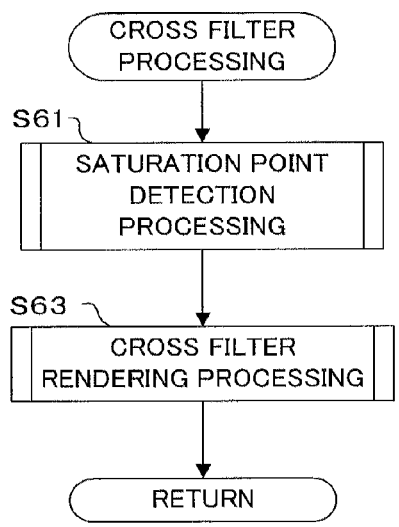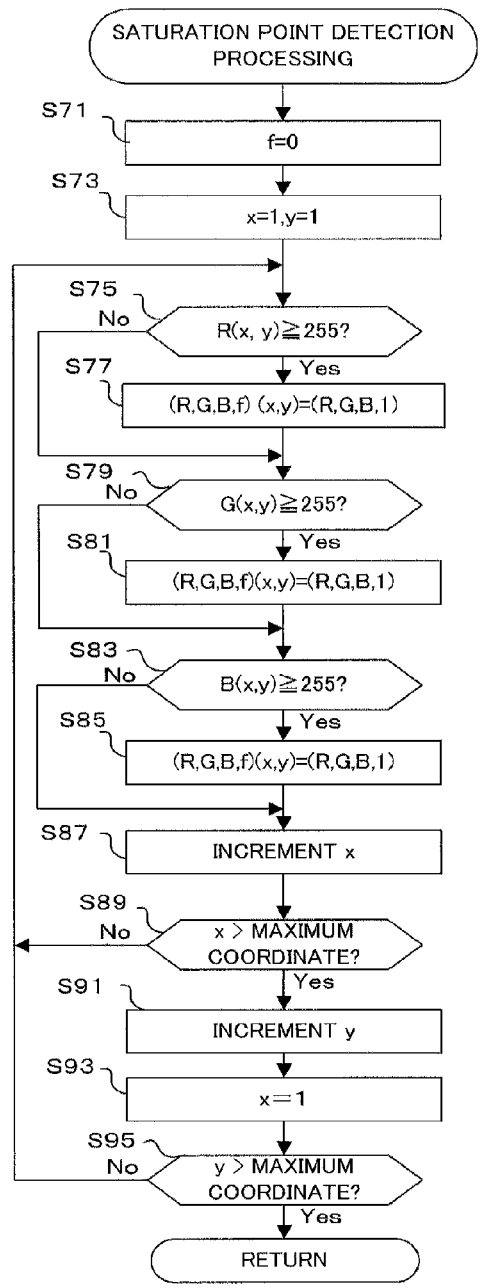

IMAGING DEVICE AND IMAGING METHOD CAPABLE OF BRIGHT SPOT PROCESSING

Benefit is claimed, under 35 U.S.C. §119, to the filing date of prior Japanese Patent Application No. 2010-249860 filed on Nov. 8, 2011. This application is expressly incorporated herein by reference. The scope of the present invention is not limited to any requirements of the specific embodiments described in the application.

BACKGROUND OF THE INVENTION

1. Field of the Invention

The present invention relates to an imaging device and an imaging method capable of applying special effects, similar to those applied when using a cross filter.

2. Description of the Related Art

Conventionally, a method of applying special effects by attaching a cross filter at the time of still picture photography is known. Also, it has been proposed to apply special effects similar to those applied when using a cross filter when taking still pictures using image processing instead of attaching a cross filter and taking pictures.

For example, Japanese patent laid-open No. Hei. 6-30373 (laid-open Feb. 4, 1994) discloses an electronic still camera capable of achieving special effects similar to those applied when using a cross filter by extracting high luminance portions from within a taken still image, and applying streaks of light (hereinafter referred to as a ray system) to centers of high luminance using image processing. According to this electronic still camera, it is possible to obtain a ray system effect easily with simple digital processing using an electronic switch, without attaching an optical cross filter.

Unfortunately, however, the techniques described in JP 6-30737 have not been used in a movie mode or a live view mode of digital cameras. In such modes, processing time to add cross filter effects is limited.

SUMMARY OF THE INVENTION

An imaging device of the present invention comprises an imaging section for converting a subject image into electrical signals and outputting image data in live view, a bright spot region setting section for setting a bright spot detection region for the image data, a bright spot detection section for detecting bright spots within the bright spot detection region set by the bright spot setting section, a bright spot processing section for performing bright spot processing at the bright spot positions detected by the bright spot detection section, and an image output section for outputting an image that has been subjected to bright spot processing by the bright spot processing detection for display or for storage.

An imaging method of the present invention converts a subject image to electrical signals and outputs image data in live view, sets a bright spot detection region for the image data, detects bright spots within the set bright spot detection region, performs bright spot processing at the detected bright spot positions, and outputs an image that has been subjected to bright spot processing for display or for storage.

BRIEF DESCRIPTION OF THE SEVERAL VIEWS OF THE DRAWINGS

These and other features, aspects, and advantages of the apparatus and methods of the present invention will become better understood with reference to the following description, appended claims, and accompanying drawings where:

FIG. 6 is a flowchart showing operation of cross filter processing of the camera of one embodiment of the invention.

FIG. 7 is a flowchart showing operation of saturation point detection processing of the camera of one embodiment of the invention.

DETAILED DESCRIPTION OF THE PREFERRED EMBODIMENTS

Preferred embodiments of the invention are described below with reference to the accompanying drawings.

In the following, preferred embodiments using a camera adopting the present invention will be described with reference to the drawings. A camera of one embodiment of the present invention is a digital camera having an imaging section. A subject image is converted to image data by this imaging section, and is then subjected to live view display on a display section arranged on a rear surface, etc., based on this converted image data. A photographer determines composition and photo opportunity by looking at the live view display. Responsive to a release operation by the photographer, image data is stored in a storage medium. Image data that has been stored in the storage medium can be played back and displayed on the display section if a playback mode is selected. Also, if a cross filter mode is set in the camera, image processing is used to give a cross filter effect to the live view display. That is, cross filter processing is performed. At the time of shooting a movie, image data having cross filter processing applied is stored.

Figure 1:
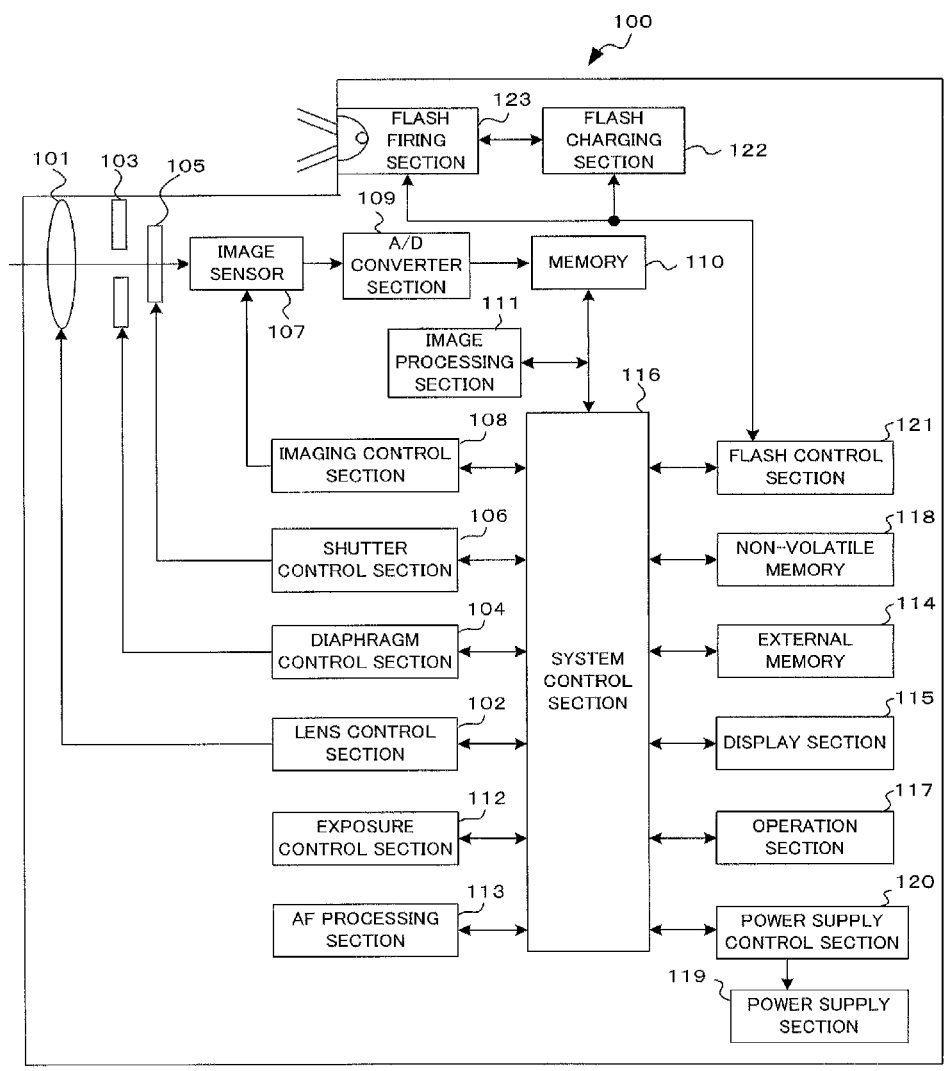
FIG. 1 is a block diagram mainly showing the electrical structure of a camera of one embodiment of the present invention.

FIG. 1 is a block diagram mainly showing the electrical structure of a camera of one embodiment of the present invention. Diaphragm mechanism (e.g., an aperture) 103, shutter 105 and image sensor 107 are arranged on the optical axis of a photographing lens 101. Output of the image sensor 107 is connected to an A/D converter section 109, and output of the A/D converter section 109 is connected to a memory 110. The memory 110 is connected to an image processing section 111 and a system control section 116. Imaging control section 108, shutter control section 106, diaphragm control section 104, lens control section 102, exposure control section 112, AF processing section 113, flash control section 121, non-volatile memory 118, external memory 114, display section 115, operation section 117 and power supply control section 120 are each connected to the system control section 116.

The foregoing imaging control section 108 is connected to the image sensor 107, the shutter control section 106 is connected to the shutter 105, the diaphragm control section 104 is connected to the diaphragm 103, and the lens control section 102 is connected to the photographing lens 101. Also, the power supply control section 120 is connected to a power supply section 119, and the flash control section 121 is connected to both a flash charging section 122 and a flash firing section 123.

The photographing lens 101 is an optical system for concentrating subject light flux onto the image sensor 107, to form a subject image. This photographing lens 101 has its focus state varied by being moved in the optical axis direction by the lens control section 102 that operates in response to commands from the system control section 116. The photographing lens 101 may be a system of lenses. The diaphragm mechanism 103 adjusts an amount of incident light of the subject light flux that is to be incident on the image sensor 107 through the photographing lens 101. The diaphragm mechanism 103 has its opening amount (e.g. f-stop) controlled by the diaphragm control section 104 that operates in response to instructions from the system control section 116.

The shutter 105 performs opening and closing in order to pass and block, respectively, light flux of a subject image formed by the photographing lens 101. It is constructed using a well-known lens shutter or focal plane shutter etc. The shutter 105 has its open time (shutter speed value) controlled by the shutter control section 106 that operates in response to instructions from the system control section 116.

The image sensor 107 that functions as an imaging section is a two-dimensional image sensor such as a CMOS image sensor or a CCD image sensor. It may include Bayer array color filters formed from the three colors of RGB arranged on a front surface, and photoelectric conversion elements, such as photodiodes, arranged in correspondence with the color filters. An image region is constituted by pixel groups composed of each color filter and its corresponding photoelectric conversion element. The image sensor 107 receives light that has been focused by the photographing lens 101 at each pixel and performs photoelectric conversion. It 107 then outputs to the A/D converter section 109, analog voltage signals (image signal) corresponding to the received light. The imaging control section 108 controls the operation of the image sensor 107 in response to instructions from the system control section 116.

The A/D converter section 109 converts an analog voltage signal (image signal) output from the image sensor 107 into a digital image signal (image data). The memory 110 is a storage section for temporarily storing various data, such as image data acquired in the A/D converter section 109 and image data that has been subjected to processing by the image processing section 111. In this specification, if a signal is based on an image signal output from the image sensor 107, it will be referred to as "image data." This includes image processed signals, and is not limited to a signal that has been subjected to A/D conversion by the A/D converter section 109.

The image processing section 111 reads out image data that has been temporarily stored in the memory 110. It performs image processing such as white balance correction processing, demosaicing processing and color conversion processing on this image data. The image processing section 111 also performs image compression at the time of storage in the external memory 114, which will be described later, and performs expansion of compressed image data that has been read out from the external memory 114.

The exposure control section 112 calculates subject brightness (brightness of a scene containing the subject) using image data temporarily stored in the memory 110. Subject brightness can be calculated using a dedicated photosensor.

The AF (autofocus) processing section 113 extracts signals for high frequency components from image data temporarily stored in the memory 110, and acquires a focus evaluation value using AF integration processing. The system control section 116 performs drive control to bring the photographing lens 101 to its focused position, by means of the lens control section 102, based on the focus evaluation value. The AF processing section 113 can also be provided with a dedicated sensor, such as a TTL (through the lens) phase difference AF sensor, to obtain an out-of-focus amount of the photographing lens 101 based on output of this dedicated sensor. The exposure control section 112 and the AF processing section 113 perform processing appropriate to respective shooting modes. That is, this processing at the time of still picture shooting is different from processing at the time of movie shooting.

The system control section 116 is constituted by an ASIC (Application Specific Integrated Circuit) including a CPU (Central Processing Unit) etc., and performs unified control of various sequences of the camera 100, such as the imaging control section 108 and the flash control section 121. As will be described later, the system control section 116 functions as a bright spot region setting section for setting a bright spot region for image data from the image sensor 107. The system control section 116 also functions as a bright spot detection section for detecting bright spots, as a bright spot processing section for performing bright spot processing at detected bright spot positions, and as an image output section for outputting an image that has been subjected to bright spot processing for display or for storage.

Figure 2:
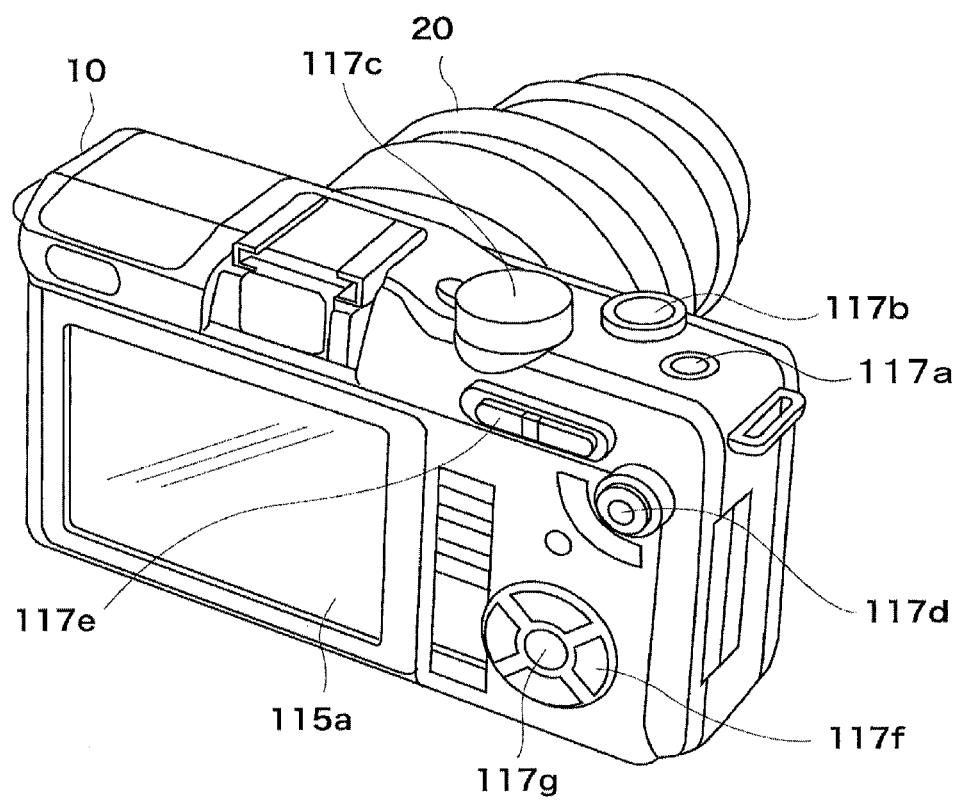
FIG. 2 is an external perspective drawing looking at a camera of one embodiment of the present invention from a rear surface.

Reforming to both FIGS. 1 and 2, the operation section 117 includes user operation input members, such as a power supply button 117a, a release button 117b, a shooting mode dial 117c, a movie button 117d, a function button 117e, a cross-shaped button 117f, an OK button 117g, a menu button and various input keys. If a user operates any of the user operation input members of the operation section 117, the system control section 116 executes various operational sequences according to the user selected operation.

The power supply button 117a within the operation section 117 is an operation member for turning a power supply section 119 of the camera 100 on or off. If the power supply button 117a is pressed, the system control section 116 turns the power supply on (via power supply control section 120), while if it is pressed again the power supply is turned off (via power supply control section 120). The release button 117b has a two-stage switch with a first release switch and a second release switch. If the release button 117b is pressed down halfway, the first release switch is closed, and if the release button is pressed down further from the halfway point to a fully pressed state, the second release switch is closed. If the first release switch is closed, the system control section 116 executes shooting preparation sequences such as AE processing and AF processing (using sections 112 and 113). Also, if the second release switch is closed, the system control section 116 executes a shooting sequence (via sections 104, 106 and 108) for still pictures and takes a picture.

The movie button 117d within the operation section 117 is a button for starting and stopping movie shooting. Initially, if the movie button 117d is pressed down, movie shooting will start, and if the movie button 117d is pressed down again, the movie shooting will stop. The shooting mode dial 117c is a dial for setting auto mode, aperture priority mode, shutter speed priority mode, movie shooting mode, scene mode, bulb shooting mode, etc.

The external memory 114 is, for example, a removable storage medium that can be inserted into and removed from the camera body. It 114 stores image data that has been compressed in the image processing section 111, and its associated data. Image data that has been stored is also read out from the external memory 114 and playback displayed on the display section 115. A storage medium for storing image data, etc., is not limited to a removable one that can be inserted into or removed from the camera body, and can be a storage medium such as a hard disk built in to the camera body.

The display section 115 includes a liquid crystal monitor 115a (Refer to FIG. 2.) or the like arranged on a rear surface of the body or the like, and live view display is provided on the monitor 115a based on image data. The display section 115 also performs playback display of taken images that have been stored in the external memory 114, and displays menu screens of settings such as exposure control values or display and shooting modes etc. Setting a cross filter mode, which will be described later, is performed on such a menu screen. It is also possible to input a setting using an operation member such as a function button 117e, as well as using a menu screen. The display section 115 is not limited to a liquid crystal monitor. For example, it 115 and can be a display such as an organic EL (organic electroluminescence diode) or some other display, as long as it can display images etc.

The non-volatile memory 118 is an electrically rewritable non-volatile memory, and stores various parameters required for operation of the camera 100. The non-volatile memory 118 also stores programs executed by the system control section 116. The system control section 116 executes various operational sequences in accordance with programs stored in the non-volatile memory 118 and parameters stored in the non-volatile memory 118.

The power supply section 119 supplies power necessary for operation of each section of the camera 100. It 119 is constituted by, for example, a power supply battery such as a secondary cell. The power supply control section 120 performs control of the power supply section 119, such as detecting power supply voltage and remaining capacity of the battery constituting the power supply section 119.

The flash control section 121 controls a charging operation of the flash charging section 122, and a firing operation of the flash firing section 123, in accordance with instructions from the system control section 116. The flash charging section 122 comprises a boost circuit for boosting the power supply voltage of the power supply section 119, and a capacitor for holding energy at the voltage boosted by the boost circuit. The capacitor holds the energy required to fire the flash firing section 123. The flash firing section 123 is provided with an arc tube such as a xenon (Xe) tube for example, and a reflecting hood, and fires using the energy held in the capacitor of the flash charging section 122 when a firing instructing is received from the flash control section 121.

Next, external appearance of the camera 100 of this embodiment will be further described using FIG. 2. FIG. 2 is an external perspective drawing of the camera 100 looking from the rear surface, and shows an interchangeable lens (or lens system) 20 fitted to the camera body 10. The power supply button 117a, release button 117b and shooting mode dial 117c are arranged on an upper surface of the camera body 10.

Also, the liquid crystal monitor 115a is arranged on the rear surface of the camera body 10. It 115a provides various displays such as live view display of a subject image or menu screen display playback display of a stored image etc. The movie button 117d and function button 117e are arranged on an upper right side of the rear surface of the camera body 10, and the cross-shaped button 117f and the OK button 117g are arranged below these buttons. The cross-shaped button 117f causes a cursor to move on the display, or on menu screens or the like displayed on the liquid crystal monitor 115a, and it is possible to confirm items selected using the cursor if the OK button 117g is pressed down.

Figure 3A:
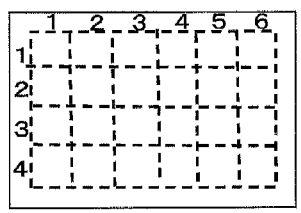
FIGS. 3A-3K are drawings illustrating a region subjected to a cross filter effect in the camera of one embodiment of the present invention.

Next, cross filter processing of this embodiment will be described using FIG. 3A to FIG. 3K. FIG. 3A shows appearance of dividing pixel groups of the image sensor 107 into 24 areas of 4 rows by 6 columns. In this embodiment, a random number is generated using a randomize function for each frame, and 1 area from among the 24 divided areas is selected based on this random number. A total of 4 areas, including the selected area and areas adjacent to the selected area, are designated as an "effect application region" ("bright spot detection region" where bright spot processing will be applied), and bright spot processing is applied for this effect application region.

Figure 3B:
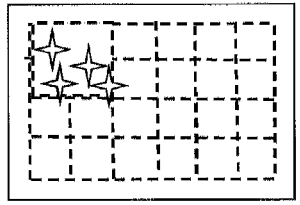
Figure 3C:
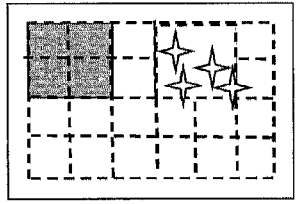
Figure 3D:
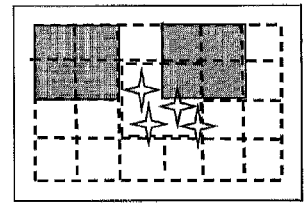

For example, FIG. 3B has a first frame selected using a randomize function, and here bright spot processing, such as cross filter processing, is applied to each of the areas (1, 1), (1,2), (2, 1) and (2,2). Then for the second frame, as shown in FIG. 3C, bright spot processing, such as cross filter processing, is applied to each of the areas (4,1), (4,2), (5,1) and (5,2). Then in the third frame, as shown in FIG. 3D, bright spot processing, such as cross filter processing, is applied to each of the areas (3,2), (3,3), (4,2) and (4,3).

Figure 3E:
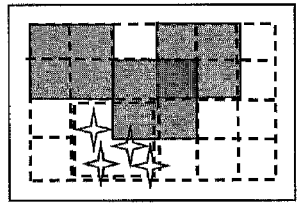
Figure 3F:
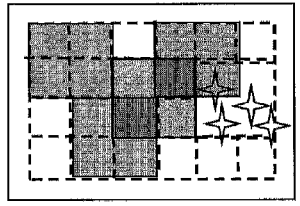
Figure 3G:
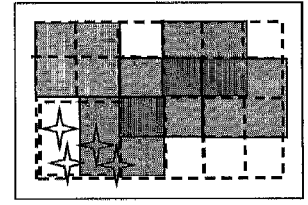

In the fourth frame, as shown in FIG. 3E, bright spot processing, such as cross filter processing, is applied to each of the areas (2,3), (2,4), (3,3) and (3,4). Then in the fifth frame, as shown in FIG. 3F, bright spot processing, such as cross filter processing, is applied to each of the areas (5,2), (5,3), (6,2) and (6,3). In the sixth frame, bright spot processing, such as cross filter processing, is applied to each of the areas (1,3), (1,4), (2,3) and (2,4), as shown in FIG. 3G.

Figure 3H:
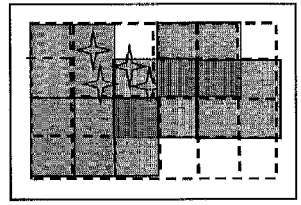
Figure 3I:
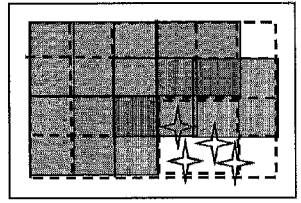
Figure 3J:
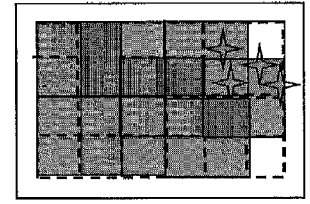

In the seventh frame, as shown in FIG. 3H, bright spot processing, such as cross filter processing, is applied to each of the areas (2,1), (2,2), (3,1) and (3,2). In the eighth frame, bright spot processing, such as cross filter processing, is applied to each of the areas (4,3), (4,4), (5,3) and (5,4), as shown in FIG. 3I. Then in the ninth frame, as shown in FIG. 3J, bright spot processing, such as cross filter processing, is applied to each of the areas (5,1), (5,2), (6,1) and (6,2).

Figure 3K:
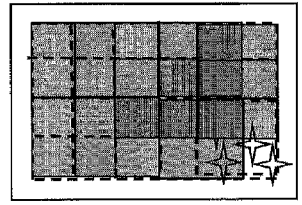

In the tenth frame, as shown in FIG. 3K, bright spot processing, such as cross filter processing, is applied to each of the areas (5,3), (5,4), (6,3) and (6,4). In this embodiment, once the effect has been applied to the tenth frame, the first frame is returned to again. As will be understood from FIG. 3A to FIG. 3K, if area selection cycles around from the first frame to the tenth frame, cross filter processing will be executed for all areas. Setting of these areas and cross filter processing as the bright spot processing are performed by the system control section 116.

Figure 4:
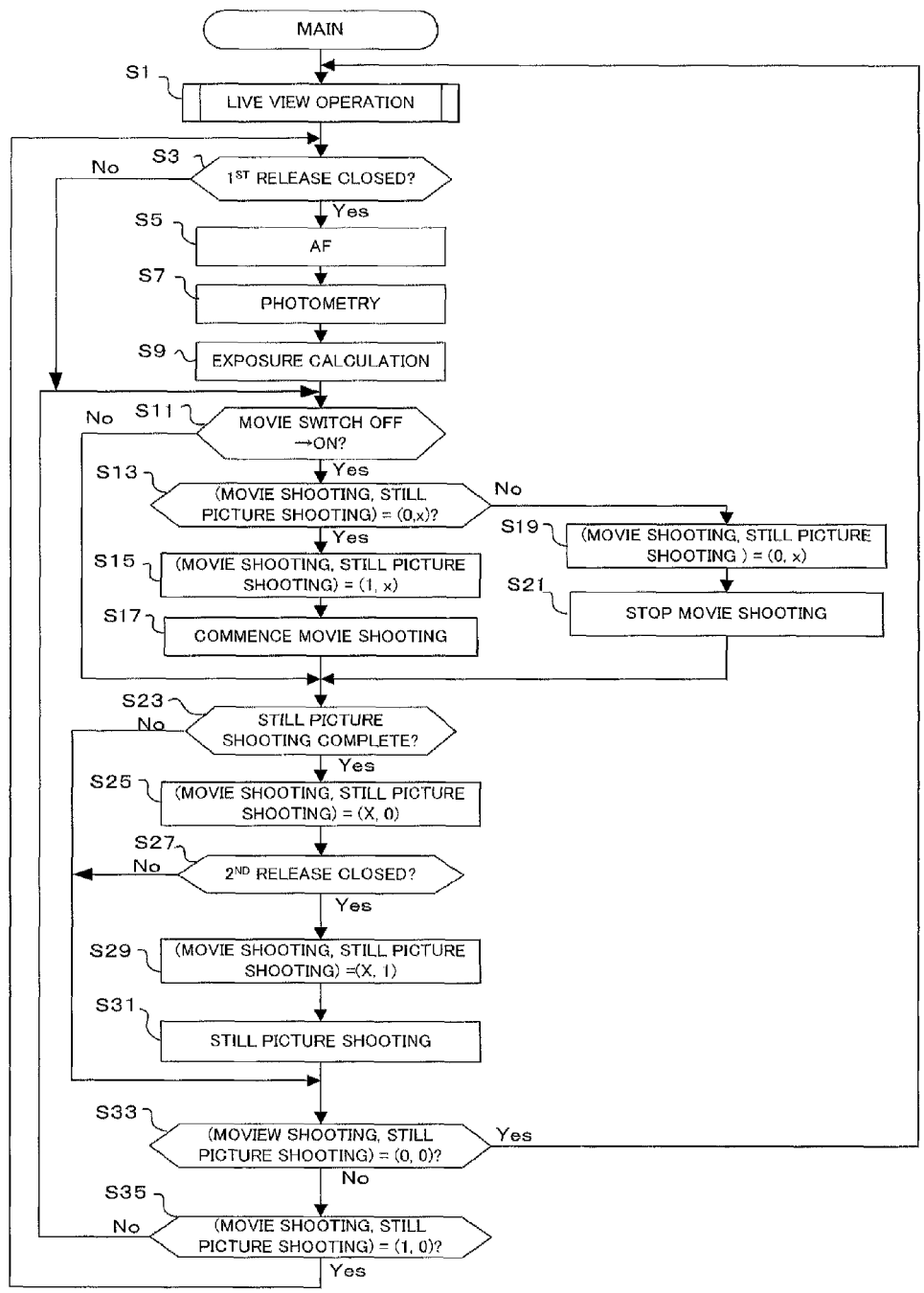
FIG. 4 is a flowchart showing main operation of the camera of one embodiment of the invention.

Next, operation of the camera 100 of this embodiment will be described using the flowcharts shown in FIG. 4 to FIG. 13. The steps of these flowcharts are executed by the system control section 116 in accordance with programs stored in the non-volatile memory 118. The processing flow shown in FIG. 4 is the main routine. Execution of this main routine commences once the power supply button 117a of the operation section 117 is turned on.

If operation of the main routine commences, a live view operation is first performed (S1). With the live view operation, image signals output from the image sensor 107 are subjected to image processing for live view display by the image processing section 111. This processed image data is then displayed on the liquid crystal monitor 115a of the display section 115. The photographer determines composition of a still picture or movie by looking at this live view display, and determines when to press the release button and the movie button. Also, when performing live view display at the time of cross filter mode setting, cross filter processing for the effect application regions (bright point detection regions), as were described using FIGS. 3A-3K, is applied to the image data, and displayed. Details of this live view operation S1 will be described later using FIG. 5.

If live view operation is carried out, it is next determined whether or not the release button 117b of the operation section 117 has been pressed down halfway (that is, whether or not the first release switch is closed (S3)). If the result of this determination is that the first release switch is closed, AF processing is next carried out (S5). In this step, the system control section 116 controls the focus state of the photographing lens 101 via the lens control section 102, based on a focus evaluation value obtained by the AF processing section 113, so that the subject image formed on the image sensor 107 becomes sharpest (in other words, so that a focused state is achieved).

Once AF processing has been performed, photometry is then performed (S7) and exposure is calculated (S9). In these steps, the exposure control section 112 calculates subject brightness, and the system control section 116 obtains exposure control values such as diaphragm (aperture) value and shutter speed using the calculated subject brightness. When calculating diaphragm (aperture) value and shutter speed, they are determined by apex calculation or table reference.

Once exposure calculation has been performed in step S9, or if a result of determination in step S3 was that the 1st release was not closed, it is next determined whether or not a movie switch that is turned on and off in association with the movie button 117d has changed from off to on (S11). Here, determination is made based on the state of the movie button 117d within the operation section 117.

If the result of determination in step S11 is that the movie switch has changed from off to on, it is next determined whether or not a movie shooting flag is 0, regardless of the state of a still picture shooting flag x (S13). Here, a movie flag of 0 represents that movie shooting is in a halted state, while a movie flag of 1 represents that movie shooting is ongoing. Also, a still picture shooting flag of 1 represents that still picture shooting is in progress, while a still picture shooting flag of 0 represents that still picture shooting is complete. A movie shooting or still picture shooting flag of x, can have an arbitrary state, that is, it can be in either state, and a flag representing the present state is maintained. At the time of reset of the camera 100, the movie shooting flag and the still picture shooting flag are both reset to 0.

If the result of determination in step S13 is that the movie shooting flag is 0 (that is, that movie shooting is in a halted state), the movie shooting flag is set to 1 and the still picture shooting flag is maintained in its present state (regardless of whether it is 0 or 1) (S15). Once this flag setting has been performed, movie shooting starts (S17). Here, image data acquired by the image sensor 107 is stored in the external memory 114 after movie processing by the image processing section 111. Live view display is also performing simultaneously on the display section 115. Also, when performing movie shooting at the time of cross filter mode setting, cross filter processing such as was described using FIGS. 3A-3K is applied to image data for storage, and stored. Details of the movie shooting at the time of this cross filter mode setting will be described later using FIG. 10.

On the other hand, if the result of determination in step S13 is that the movie shooting flag is 1 (that is, that movie shooting is in progress), the movie shooting flag is set to 0 and the still picture shooting flag is maintained in its present state (regardless of whether it is 0 or 1) (S19). Since it is detected in step S11 that the movie button 117d has been pressed down during movie shooting, flag processing for movie shooting stop is performed in this step. Once this flag setting has been performed, movie shooting is stopped (S21). Here, processing for terminating a storage operation for movie image data is performed.

If movie shooting has commenced in step S17, or if movie shooting has been stopped in step S21, it is next determined whether or not shooting of a still picture is complete (S23). (If it is determined in step S27, which will be described later, that the second release is closed, still picture shooting starts, and once still picture image data has been stored in the external memory 114, still picture shooting is completed.) In this step S23, therefore, determination is based on whether or not this series of operations is in progress, or is complete.

If the result of determination in step S23 is that still picture shooting has been completed, the movie shooting flag is maintained in its present state and the still picture flag is set to 0 (S25). Once this flag setting has been performed, it is next determined whether or not the 2nd release button is closed (S27). Here it is determined whether or not the release button 117b within the operation section 117 has been pressed down fully.

If the result of the determination in step S27 is that the second release is on, the movie shooting flag is maintained in its present state, and the still picture shooting flag is set to 1 (S29). Still picture shooting is then performed (S31). Here, image data that has been acquired by the image sensor 107 is stored in the external memory 114 after still image processing by the image processing section 111.

Once still picture shooting has been performed (or if still picture shooting is not complete at S23), it is determined whether or not both the movie shooting flag is 0 and the still picture shooting flag is 0 (S33). Here it is determined whether or not movie shooting is not in progress and still picture shooting is not in progress. If the result of this determination is Yes (that is, that movie shooting is finished and that still picture shooting is finished), processing returns to step S1.

If the result of determination in step S33 is No (that is, that movie shooting is in progress or still picture shooting is in progress), it is next determined whether or not the movie shooting flag is 1 and the still picture shooting flag is 0 (S35). Here it is determined whether movie shooting is in progress but still picture shooting is not in progress.

If the result of determination in step S35 is Yes (that is, that still picture shooting is not in progress and movie shooting is being performed), processing returns to step S3 and movie shooting continues. On the other hand, if the result of determination in step S35 is No (that is, that movie shooting has been completed but still picture shooting is not complete (still in progress)), processing returns to step S11 and still picture shooting continues.

In this manner, in the main flow of this embodiment together with performing live view display, starting and stopping of movie shooting is switched every time the movie button 117d is operated, and still picture shooting is executed in accordance with pressing the release button 117b fully down. When the cross filter mode is set, cross filter processing is applied to effect application regions at the time of live view display or movie shooting.

Next the live view operation of step S1 will be described in detail using FIG. 5. If the live view operation is entered, it is determined whether or not cross filter mode is set (S41).

If the result of determination in step S41 is that cross filter mode has been set, then a random number is generated (S43) and effect application regions are determined (S45). Here, as was described using FIGS. 3A-3K, pixels of the image sensor 107 are divided into 24 regions of 4 rows by 6 columns, a random area is selected from among these areas, and an effect application region (bright spot detection region) is determined based on this selected area.

First, the random number is generated, and an area determined using this random number, together with areas adjacent to the right, below, and diagonally below and right, giving a total of 4 areas, are set as an effect application region. With this embodiment, four areas are made an effect application region (bright spot detection region) but it is also possible to have a number of bright spot detection regions, or for the number of areas to be more or less than 4 depending on the number of pixels within the bright spot detection region etc.

Referring back to step S43, a random number (RND) is generated as a value between 0.000000 and 0.999999. With the example shown in FIGS. 3A-3K, since the image sensor is divided into 4 rows and 6 columns, $$x=INT(RND \times 6+1), y=INT(RND \times 4+1)$$

is defined as a position of an area, and this area, together with areas to the right, below, and diagonally to the right and below of this area, are made the bright spot detection area. Here INT means an integer part of the value within parenthesis.

Once random number generation and determination of effect application region have been performed, cross filter processing is performed (S47). Here, within the effect application region determined in step S45, bright spot sections that are shining brightly are detected and cross filter rendering processing to impart an effect similar to optical cross filter is applied to the detected regions. Details of this cross filter processing will be described later using FIG. 6 to FIG. 8.

Once cross filter processing has been performed in step S47, or if the result of determination in step S41 was that cross filter mode was not set, display is next carried out (S51). Here live view display is performed on the display section 115 based on image data from the image sensor 107. When cross filter mode is set, live view display with cross filter processing applied is performed.

If display has been performed, it is next determined whether or not acquisition of the next frame is completed (S53). More specifically, it is determined whether or not image data for the next frame has been acquired by the image sensor 107. In the case of a frame rate of 30 fps, frames are acquired at a rate of once every 1/30th of a second. If the result of this determination is that acquisition of the next frame is not complete, processing returns to step S51, while on the other hand if acquisition is complete, processing returns to step S41.

Next the cross filter processing of step S47 will be described using FIG. 6. If the cross filter processing is entered, saturation point detection processing is first performed (S61). Here, it is determined whether or not image data of RGB for all pixels within the effect application region that was determined in step S45 is equal to or greater than a brightness value corresponding to a saturation value, and bright spots equal to or greater than the saturation point are detected. Details of this saturation point detection processing will be described later using FIG. 7.

If the saturation point detection processing has been performed, cross filter rendering processing is performed next (S63). Here, image processing to create an effect similar to the case where an optical cross filter has been attached is applied to bright spots detected in step S61. Details of this cross filter rendering processing will be described later using FIG. 8.

Next the saturation point detection processing of step S61 will be described using FIG. 7. If the flow of saturation point detection processing is entered, then a flag f indicating a saturation point is reset to 0 (S71). Next coordinates (x, y) representing the position of a pixel are initialized to x=1, y=1 (S73). Coordinates of the pixel put the upper left corner of the set effect application region at position (1,1).

Next it is determined whether or not R data for position (x, y) is larger than 255 (S75). With this embodiment each of RGB data constituting pixel data is made up of 8 bits, and has a maximum value of 255 if expressed as a decimal number. Accordingly, this numerical value 255 can be appropriately determined based on the number of bits of image data, or made a value that is smaller than a maximum value determined by bit number, as long as it is a level that can be regarded as a saturated state.

If the result of determination in step S75 is that $R(x,y) \geq 255$ (that is, if the R value of the pixel under consideration is saturated), then next (R, G, B, f) (x, y)=(R, G, B, 1) is set (S77). Here, within image data for position (x, y), R data, G data and B data is kept the same as the acquired value, and a flag f representing saturation point is made 1. By setting the flag f to 1 (f=1), image data for the pixel of position (x, y) represents that saturation has been reached and it is a bright spot.

In step S77, if (R, G, B, f) (x, y)=(R, G, B, 1) is set, or if the result of determination in step S75 was R(x,y)<255, it is next determined whether or not $G(x,y) \geq 255$ (S79) (that is, if the G value of the pixel under consideration is saturated). Here, it is determined whether or not G data for position (x, y) is larger than 255.

If the result of determination in step S79 is that G (x,y) $\geq 255$, then next (R, G, B, f) (x, y)=(R, G, B, 1) is set similarly to step S77 (S81). If this processing is performed, or if the result of determination in step S79 was G (x, y)<255, it is next determined whether or not B (x,y)$\geq 255$ (S83) (that is, if the B value of the pixel under consideration is saturated). Here, it is determined whether or not B data for position (x, y) is larger than 255.

If the result of determination in step S83 is that B (x,y) $\geq 255$, then next, similarly to step S77, (R, G, B, f) (x, y)=(R, G, B, 1) is set (S85). Once this processing has been performed, or if the result of determination in step S83 was B (x,y)<255, then next x representing the pixel position is incremented by 1 (S87).

Once x has been incremented in step S87, it is then determined whether or not x>a maximum coordinate (S89). As described previously, an effect application region is determined in step S45, and it is determined whether or not the x coordinate within this determined effect application region has reached the maximum coordinate. If the result of this determination is that x has not reached the maximum coordinate, processing returns to step S75, and whether any of the RGB data is not saturated is detected for the pixel at the position of the adjacent x coordinate.

If the result of determination in step S83 was that x has reached the maximum coordinate, then next y representing the pixel position is incremented by 1 (S91). Next, x representing the pixel position is set to 1 (S93).

Next, it is determined whether or not y>a maximum coordinate (S95). It is determined whether or not the y coordinate within the effect application region that was determined in step S45 has reached the maximum coordinate. If the result of this determination is that y has not reached the maximum coordinate processing returns to step S75, and whether any of the RGB data is not saturated is detected, sequentially from x=1, for the pixel at the position of the adjacent y coordinate. On the other hand, if the result of determination is that y has reached the maximum coordinate, the original processing flow is returned to.

Figure 8:
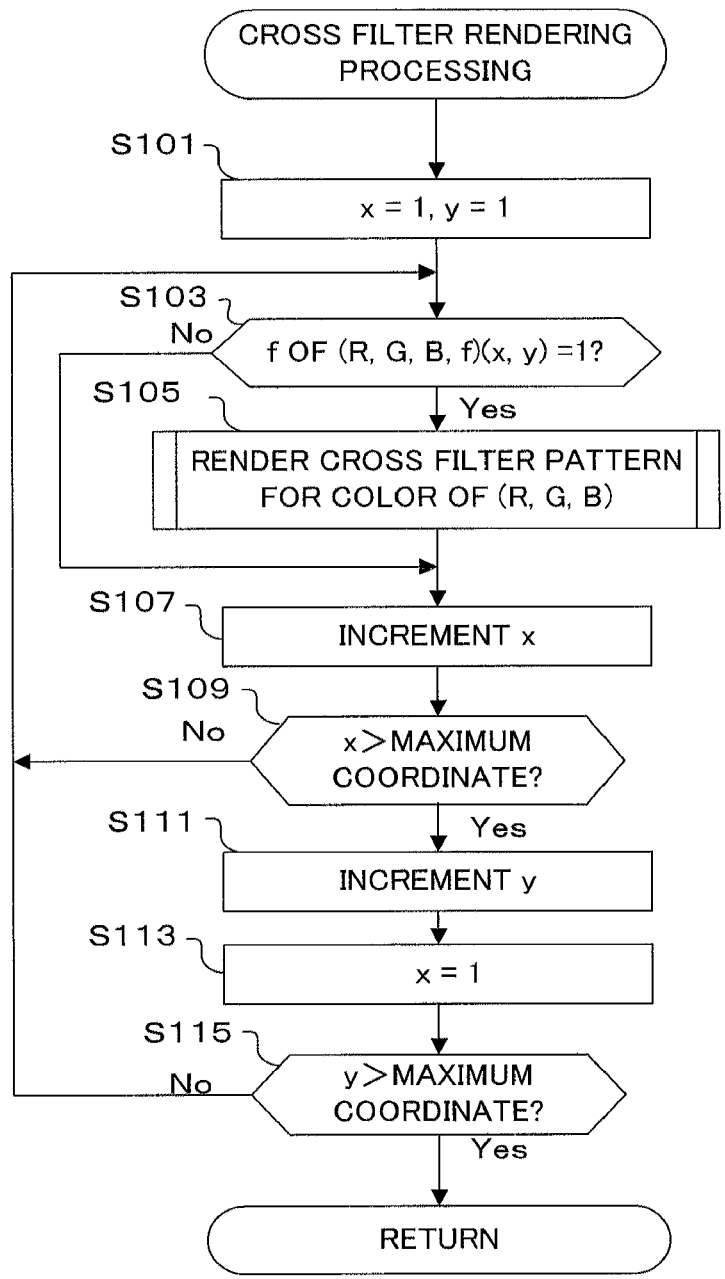
FIG. 8 is a flowchart showing operation of cross filter rendering processing of the camera of one embodiment of the invention.

Next the cross filter rendering processing of step S63 will be described using FIG. 8. If the processing flow for cross filter rendering processing is entered, first, similarly to step S73, the position (x, y) of a pixel of image data is initialized to x=1, y=1 (S101).

Once the pixel position has been initialized, it is next determined whether or not f of (R, G, B, f)=1 (S103). If at least one of the RGB image data was found to be saturated and the corresponding flag was set in step S77, S81 or S85, a saturation flag f is set to 1. In this step, it is determined whether or not the saturation flag f has been set to 1 for image data of the pixel position (x, y).

If the result of determination in step S103 is that the saturation flag f is 1, rendering of a cross filter pattern for the color (R, G, B) is performed (S105). Here, a pixel position (x, y) with the saturation flag f set to 1 is made a center, and image processing to apply a ray system is applied around this center.

Once rendering of the cross filter pattern has been performed, or if the result of determination in step S103 is that f of (R, G, B, f) is not 1, next, similar to step S87, x representing the position of the pixel is incremented (S107). Once x has been incremented, similar to step S89 it is determined whether or not x>a maximum coordinate (S109). If the result of this determination is not that x>the maximum coordinate, processing returns to step S103, and the previously described processing is repeated for image data of the pixel at the coordinate position of the incremented x.

On the other hand, if the result of determination in step S109 is that x>the maximum coordinate, then similar to step S91, y representing the position of the pixel is incremented (S111). Once y has been incremented, similar to step S93, x representing the position of the pixel is set to 1 (S113).

Next, similar to step S95 it is determined whether or not y>a maximum coordinate (S115). If the result of this determination not that y>the maximum coordinate, processing returns to step S103, and the previously described processing is repeated sequentially from x=1 for the incremented y coordinate. On the other hand, if the result of determination in step S115 is that y>the maximum coordinate, the original process flow is returned to.

In this way, in the flow for live view operation of this embodiment, an effect application region is determined every time a frame image is acquired for performing live view display, bright spot detection (saturation point detection) is performed within that determined effect application region, and image processing to impart an effect similar to that when a cross filter is attached is performed for the detected bright spots (saturation points) (refer to S105). An image to which this cross filter processing has been applied is displayed on the display section 115 as a live view display. It is therefore possible for the photographer to easily confirm an image to which cross filter processing has been applied.

Next, a modified example of live view operation of this embodiment will be described using FIG. 9. With the live view operation of the one embodiment of the present invention that was described using FIG. 5 to FIG. 8, saturation points were detected every time one frame image is acquired, and cross filter processing for representing a ray system was applied to image data of the detection saturation points. If a region in which this cross filter processing is carried out is widened, the time required for processing is prolonged, and it becomes difficult to perform processing for every one frame. In this modified example, therefore, cross filter processing is performing for every few frames, with the intention of reducing processing time.

Figure 5:
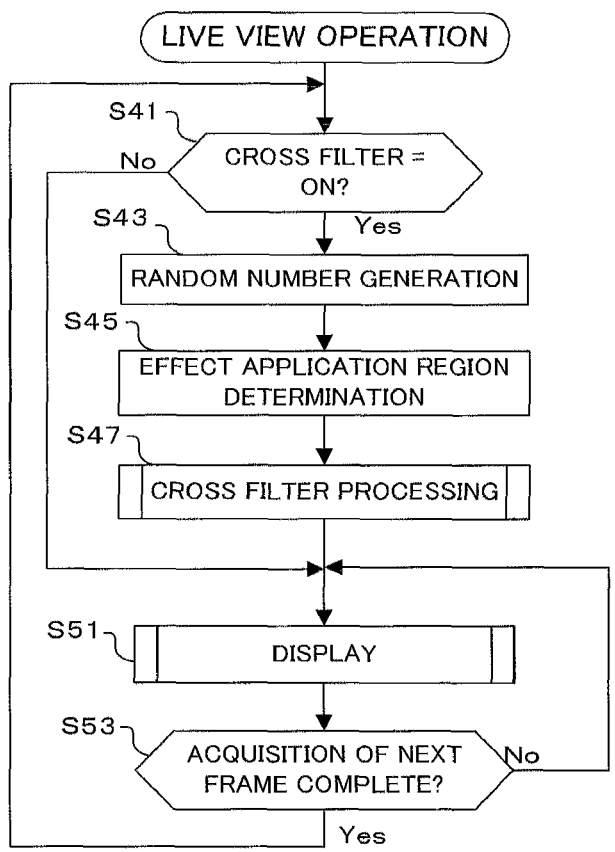
FIG. 5 is a flowchart showing live view operation of the camera of one embodiment of the invention.

Compared to the live view operation of FIG. 5, the flow of the live view operation of this modified example only has the addition of steps S48-S50, S55 and S57, and description will center on these added portions.

When the flow of the live view operation of this modified operation is entered and cross filter mode has been set (Yes at step S41), a random number is generated (S43) and an effect application region is determined (S45). Next, cross filter image creation processing is carried out (S48). Once a frame image 203 for live view display has been acquired (refer to FIG. 14A), in step S48 a cross filter image 201 for image composition separate from this frame image 203 is generated. This cross filter image for image composition 201 is an image formed by generating a ray system 201a in a region of the effect application region that was determined in step S45, based on the frame image for live view display, and extracting only this ray system 201a.

If the cross filter image is generated in step S48, next N is set as an effect application flag (S49). The effect application flag is a natural number N representing every how many frames an effect using cross filter is to be applied. Cross filter processing is executed for the Nth acquired image.

Figure 14A:
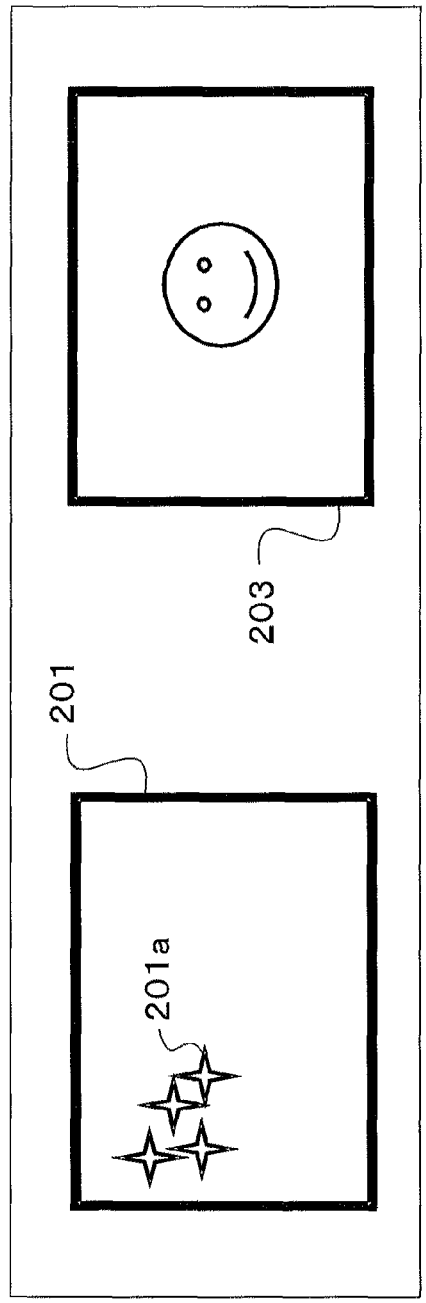
FIGS. 14A and 14B are drawings illustrating an image with cross filter in the camera of one embodiment of the present invention.
Figure 14B:
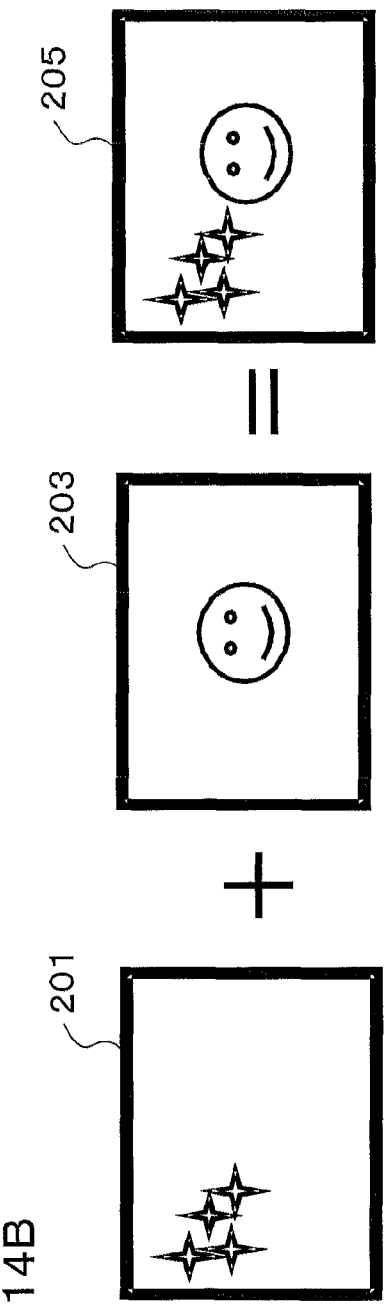

Once the effect application flag has been set, cross filter image composition processing is next performed (S50). Here, as shown in FIG. 14B, a frame image for live view display 203 is combined with the cross filter image for image composition 201 that was generated in step S48, to generate a composite image for display 205.

If cross filter image composition processing has been performed, display is performed (S51), it is next determined whether or not acquisition of the next frame is completed (S53). If the result of this determination is that acquisition of the next frame is not complete, processing returns to step S51.

On the other hand, if the result of determination in step S53 is that acquisition of the next frame image has been completed, 1 is subtracted from the effect flag, and the result after subtraction is made the effect application flag (S55). Next, it is determined whether or not this effect application flag is 0 (S57). If the result of this determination is that the effect flag is not 0, processing returns to step S50. Accordingly, until the effect application flag becomes 0, the same cross filter image is combined with a newly acquired frame image for live view display without creating a new cross filter image in step S48, to create a composite image for display, and live view display is carried out.

If the result of determination in S57 is that the effect application flag has become 0, processing returns to step S41. As a result, if the cross filter mode is set a new cross filter image for image composition is generated, and the above described processing is repeated.

In this way, with this modified example, a cross filter image for image composition is generated for every specified number of frames (here N frames), and even if the cross filter processing is prolonged by the extent of N frames, there is no need to reduce the frame rate for live view because processing for a cross filter effect is reduced.

Next, cross filter movie shooting when cross filter mode is set, for movie shooting, which starts in step S17 and stops in step S21 of FIG. 4, will be described in detail using FIG. 10. If the processing flow for cross filter movie shooting is entered, then similar to step S41 it is first determined whether or not cross filter mode has been set (S121).

Figure 9:
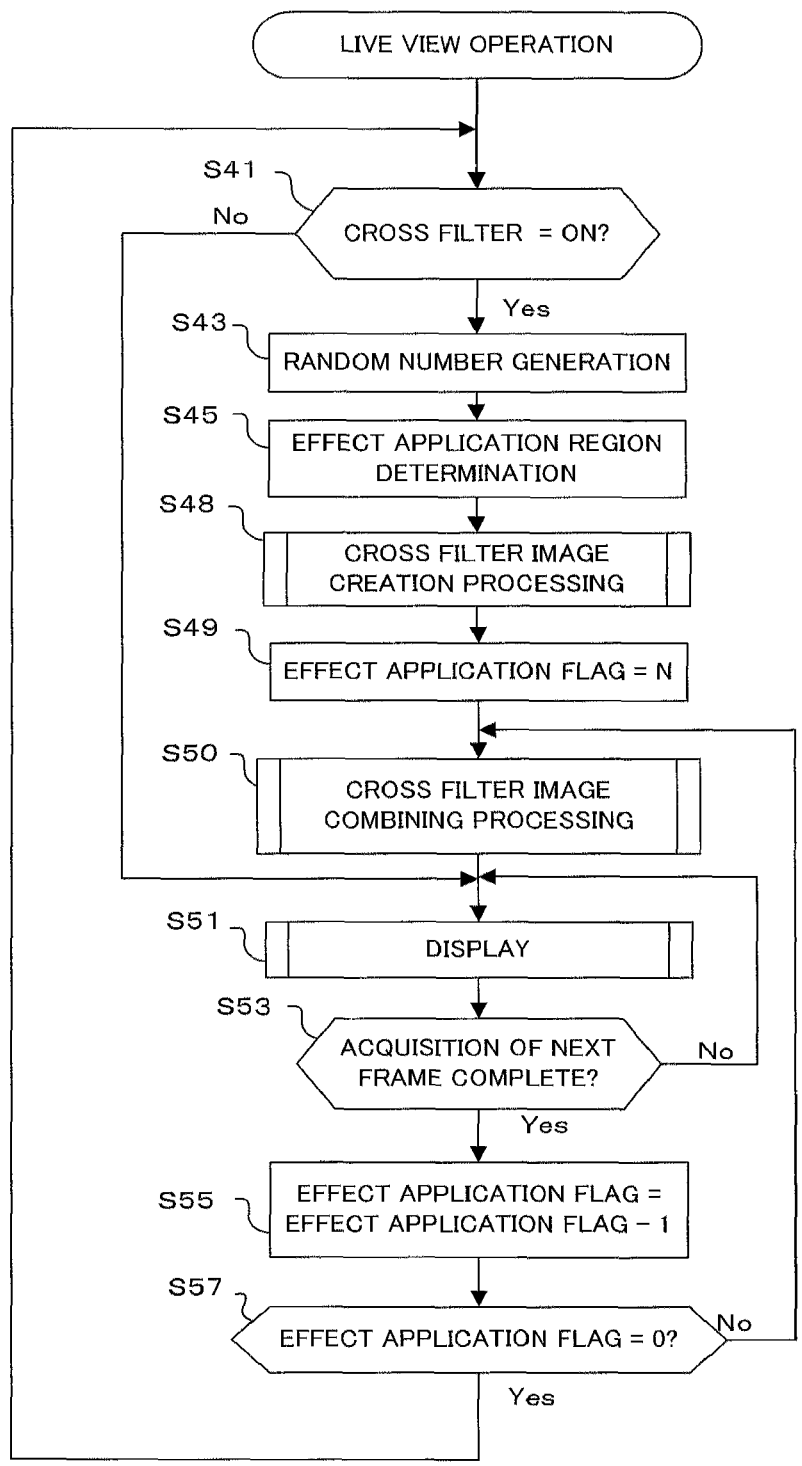
FIG. 9 is a flowchart showing a modified example of live view operation of the camera of one embodiment of the invention.

If the result of determination in step S121 is that cross filter mode has been set, then similar processing to steps S43 to S57 in FIG. 9 are performed. That is, similar to step S43, a random number is generated (S123), and similar to step S45 an effect application region is determined based on this random number (S125).

Once an effect application region has been determined, then similar to step S48 cross filter image generation processing is performed (S127). Here, as shown in FIG. 14A, a cross filter image for image composition 201 that is a separate image from the frame image 203 is generated. However, at the time of live view operation, image data of a number of pixels for live view display is used, but at the time of video shooting, image data of a number of pixels of a level to be stored in the external memory 114 for a frame image 203 and image composition 201 are processed.

Once a cross filter image for image composition has been created, then similar to step S49, the effect application flag is to N (S129), and similar to step S50 cross filter image composition processing is performed (S131).

If the result of determination in step S121 was that cross filter mode was not set, or if cross filter image composition processing was performed in step S131, similar to step S50, display is next performed (S141). Here, image data for storage during movie shooting that has been subjected to cross filter processing is converted to image data for display and displayed on the display section 115. Also, in parallel with this display, image data that has been subjected to cross filter processing is stored in the external memory 114 after having been subjected to compression processing. In the case where cross filter mode has not been set, display and storage of a normal movie image is performed.

If display has been performed, it is next determined, similarly to step S53, whether or not acquisition of the next frame is completed (S143). If the result of this determination is that acquisition is not complete, processing returns to step S141. On the other hand, if acquisition of the next frame is complete, next, similar to step S55, 1 is subtracted from the effect flag, the result of subtraction is set as the effect application flag (S145), and it is determined whether or not this effect application flag is 0 (S147). If this effect flag is not 0, processing returns to step S131. Accordingly, until the effect application flag becomes 0, the same cross filter image is combined with a newly acquired frame image of a taken image for storage without creating a new cross filter image in step S127, to create a composite image for storage, and this composite image is stored in the external memory 114. Also, a taken image that has been subjected to cross filter processing is converted for display and displayed on the display section 115.

On the other hand, if the result of determination in S147 is that the effect application flag has become 0, processing returns to step S121. As a result, if the cross filter mode is set a new cross filter image for image composition is generated, and shooting of a movie continues.

In this way, with the cross filter movie shooting of this embodiment, by performing substantially similar processing to the live view operation that was described using FIG. 9, it is possible to both display and store a movie that has been subjected to cross filter processing. Particularly in the case of movie shooting, since the amount of image data to be stored becomes large, and processing time is also prolonged, by performing cross filter processing only every specified number of frames, it is possible to reduce processing.

Next a first modified example of cross filter movie shooting of this embodiment will be described using FIG. 11 and FIG. 12. With this embodiment, in cross filter processing at the time of cross filter movie shooting, there was image processing to add a uniform ray system. With this modified example, in the cross filter processing a random number is generated and random changes are applied using this random number.

Figure 10:
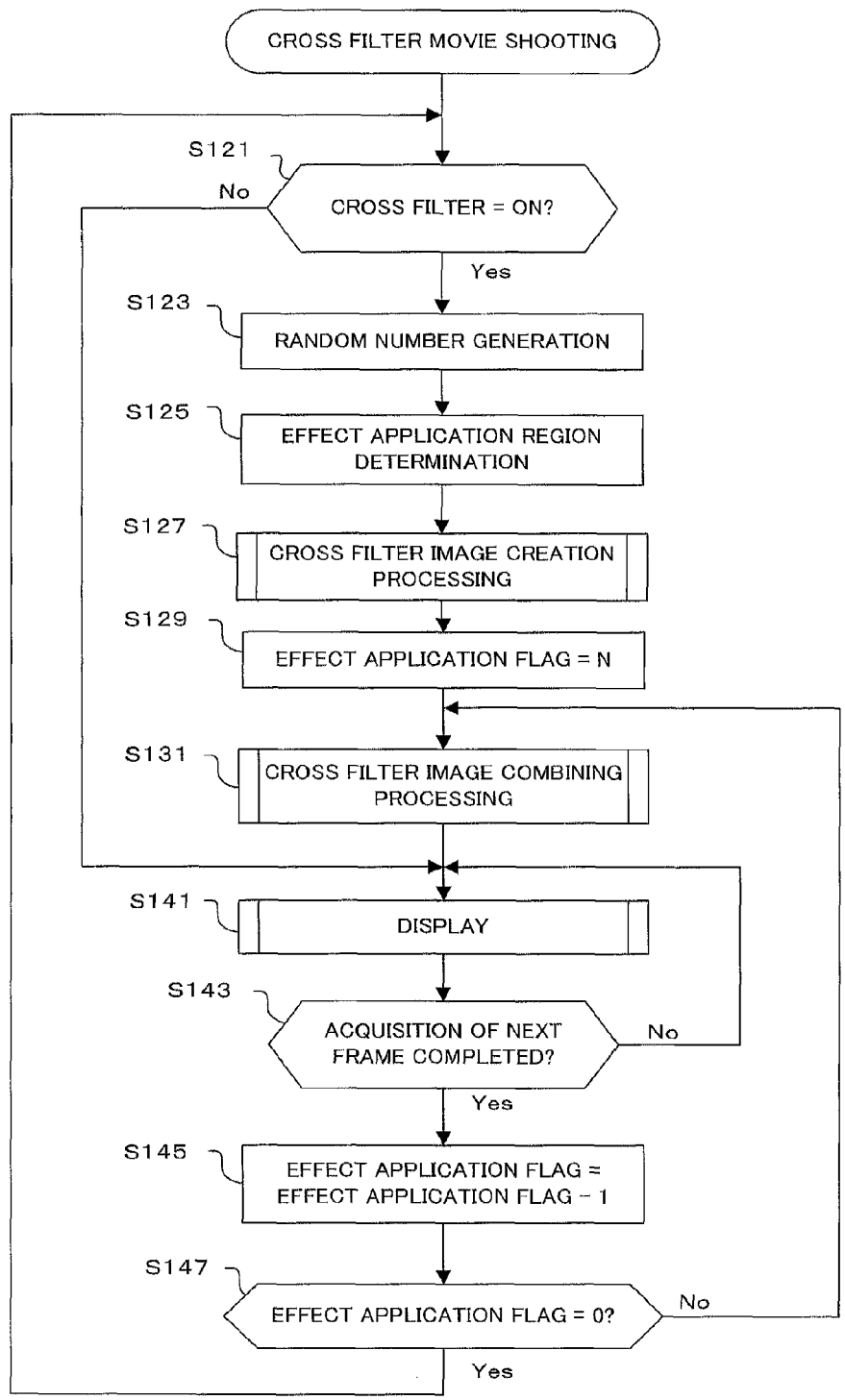
FIG. 10 is a flowchart showing operation of cross filter movie shooting for the camera of one embodiment of the invention.
Figure 11:
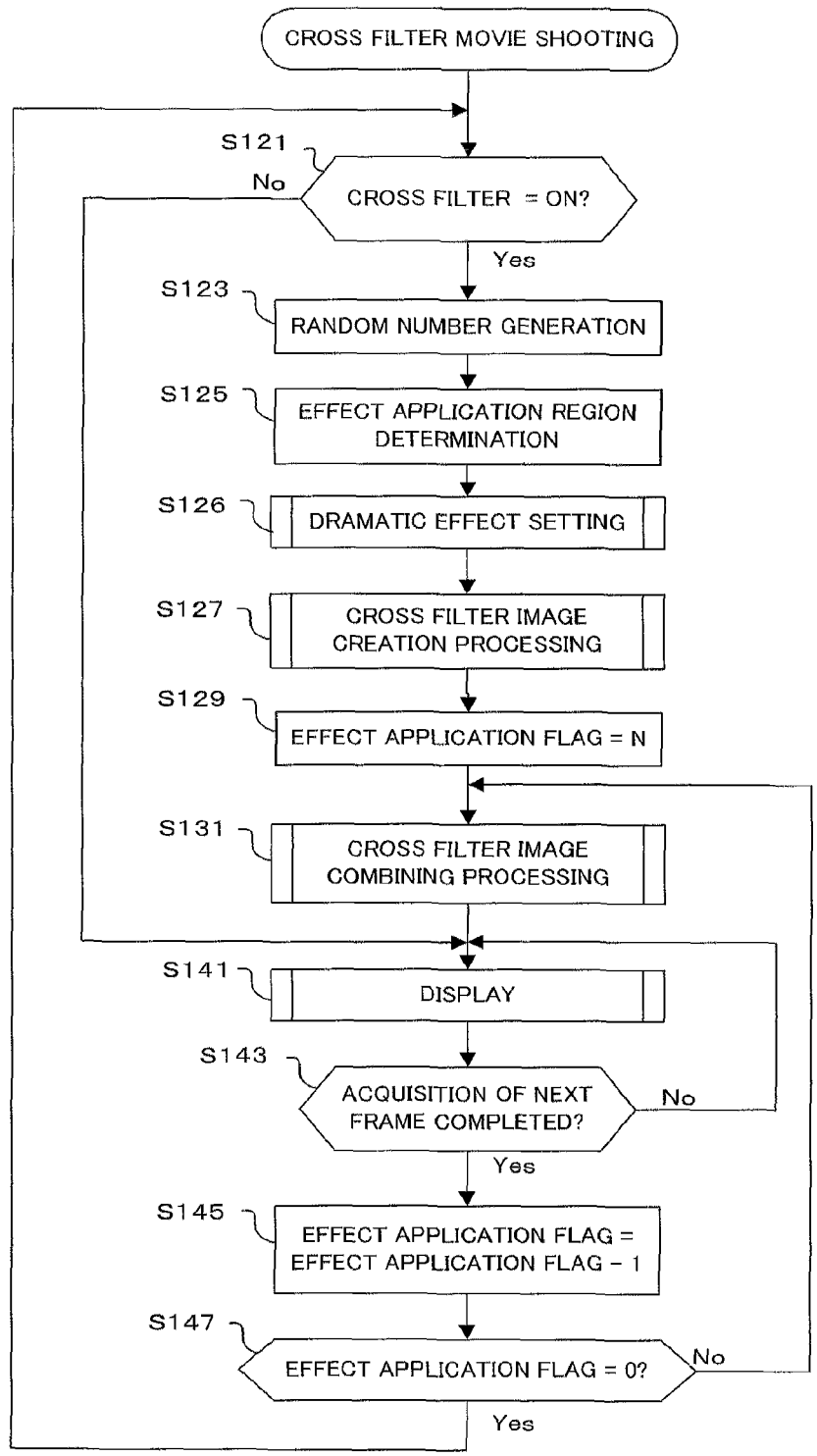
FIG. 11 is a flowchart showing operation of a first modified example of cross filter movie shooting for the camera of one embodiment of the invention.
Figure 12:
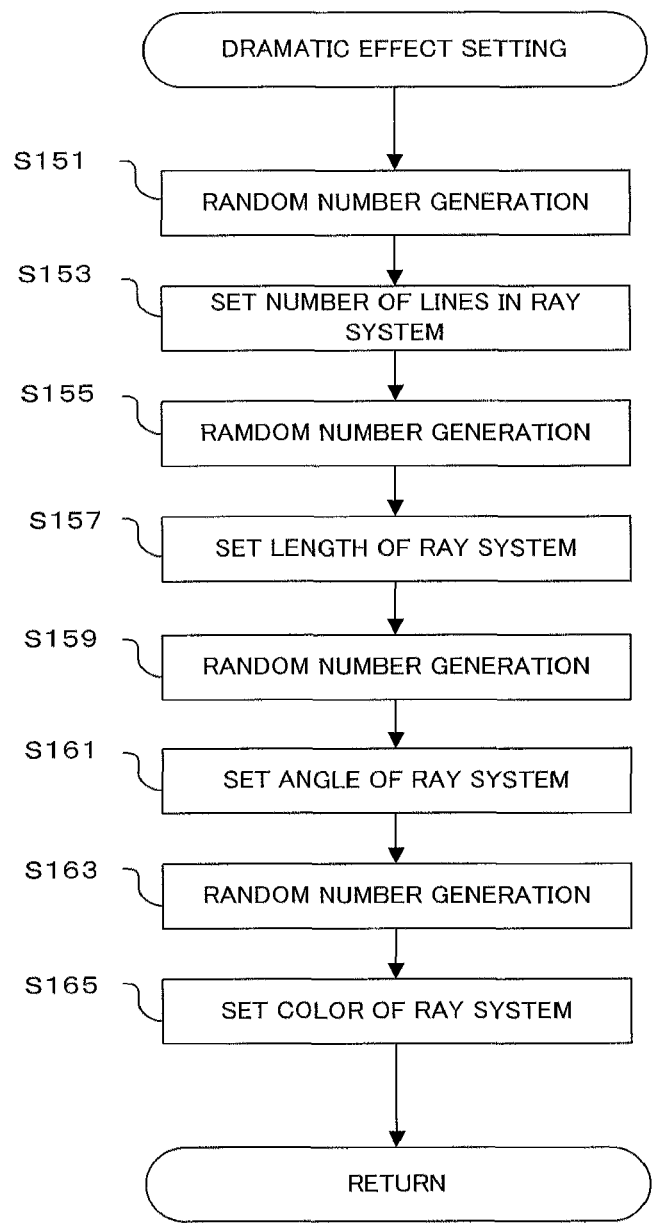
FIG. 12 is a flowchart showing operation of a dramatic effect setting for the first modified example of cross filter movie shooting for the camera of one embodiment of the invention.

Processing flow for cross filter movie shooting of this modified example shown in FIG. 11, only has the addition of step 126 compared to the processing flow for cross filter movie shooting of the embodiment of the invention shown in FIG. 10, while other steps are the same as for the embodiment. Step S126 is setting a dramatic effect for cross filtering for the effect application region that was determined in step S125. Details of this dramatic effect setting will be described using FIG. 12.

If the dramatic effect setting processing flow is entered, first a random number is generated (S151), and then a number of rays of the ray systems is set depending on this generated random number (S153). As a number of rays for the ray system, a number that is close to the generated random number, such as 4, 6, or 8, is set.

Once the number of rays of the ray system has been set, a random number is generated again (S155), and length of the ray system is then set (S157). A length close to the generated random number, such as from among short (=4), middle (=6) or long (=8), is set as the length of the ray system. A numerical value in parenthesis is a random number value.

Once the length of the ray system has been set, a random number is generated again (S159), and then angle of the ray system is set (S161). A length close to the generated random number, such as from among 0 degrees (=4), 3 degrees (=6) or 45 degrees (=8), is set as the angle of the ray system. A numerical value in parenthesis is a random number value.

Once the ray system able has been set, a random number is generated again and the ray system color is set (S165). A color close to the generated random number, such as from among red (=4), green (=6) or blue (=8), is set as the ray system color. A numerical value in parenthesis is a random number value. Once the ray system color has been set, original processing flow is returned to.

Alternatively, a single random number can encode a combination of number of rays, length, angle and color.

In this way, in this modified example, the number of rays, length, angle and color etc. of the ray system are different each time the cross filter processing is performed. This, therefore, results in an image having varied cross filter processing applied, and which arouses interest. With this modified example, a random was generated and rendering set in accordance with this random number, but this is not limiting and it is also possible to apply specified programmed changes across a number of frames. Ray system changes and the exemplifications are also not limiting, and it is also possible to have only some of them.

Figure 13:
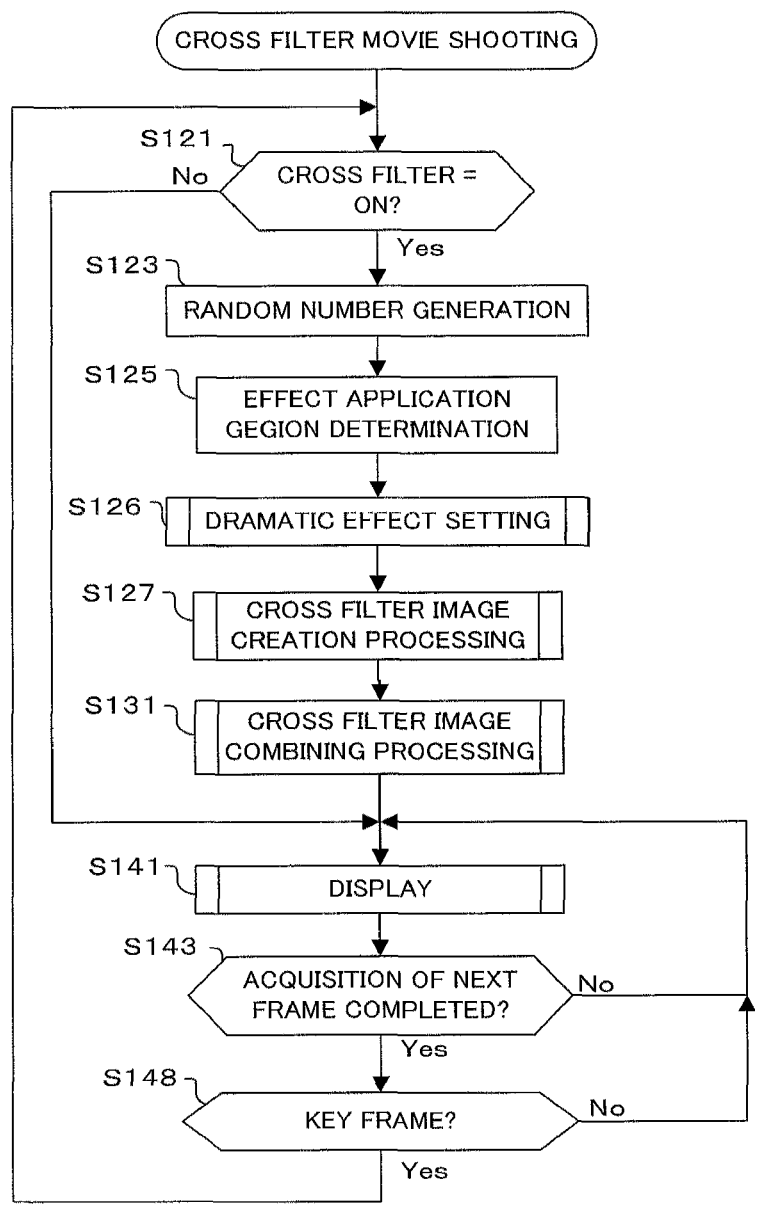
FIG. 13 is a flowchart showing operation of a second modified example of cross filter movie shooting for the camera of one embodiment of the invention.

Next a second modified example of cross filter movie shooting of this embodiment will be described using FIG. 13 and FIG. 15. In the embodiment and first modified example, cross filter images for image composition were generated at an effect application flag N frame interval. This processing is cross filter processing most suitable for motion JPEG, but in the case of adopting MPEG, it is possible to impart an effect by applying cross filter processing to only a key frame. A key frame normally appears at intervals of 2 seconds, which means that it is possible to secure sufficient processing time, and as a result it becomes possible to widen the effect application region compared to the previously described embodiment and modified example.

This modified example is the same as the flow chart for the first modified example shown in FIG. 11 except for the fact that setting of the effect application flag in step S129 and the step for subtracting 1 from the effect application flag in step S145 are omitted, and the determination in step S148 has been changed to determination as to whether or not it is a key frame. For steps that execute the same processing as in the processing flow of FIG. 11, the same step numbers will be affixed and description will center on points of difference.

Figure 15A:
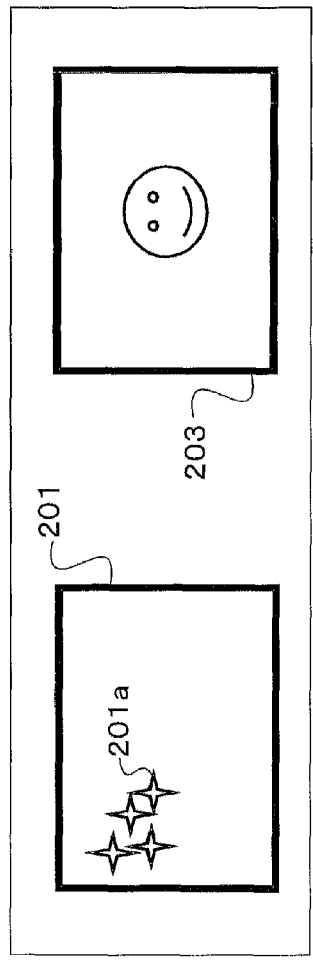
FIGS. 15A-15C are drawings illustrating an image for a second modified example of cross filter movie shooting in the camera of one embodiment of the present invention.

If the result of determination in step S121 is that cross filter mode has been set, a random number is generated (S123), determination of an effect application region is performed in accordance with this random number, a dramatic effect is set (S126), and generation processing for a cross filter image is performed in accordance with the set dramatic effect (S127). Here, as shown in FIG. 15A, a cross filter image for image composition 201 used in cross filter processing and that is a separate image from the frame image 203, is generated.

Figure 15B:
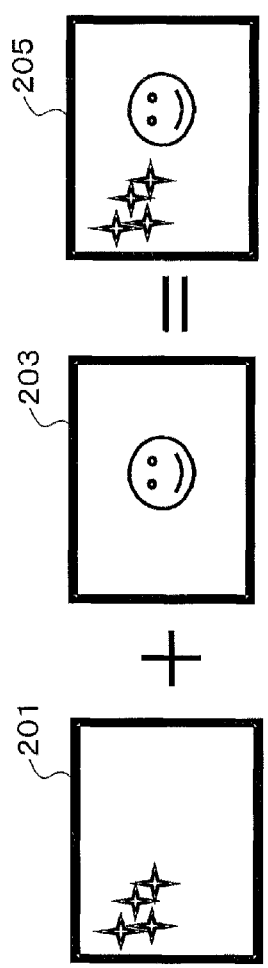

Once generation processing for the cross filter image has been performed in step S127, with the first modified example setting of an effect application flag was next performed. However, with this modified example this setting is omitted because the effect application flag is not used, and next cross filter image composition processing is performed (S131). Here, as shown in FIG. 15B, the cross filter image for image composition 201 is combined with the frame image 203, to create the composite image 205.

If cross filter image composition processing has been performed, display is (and storage are) performed next (S141), and it is determined whether or not acquisition of the next frame is completed (S143). If the result of this determination is that acquisition of the next frame is not complete, processing returns to step S141, and display continues.

On the other hand, if the result of determination in step S143 is that acquisition of the next frame is complete, it is determined whether or not it is a key frame (S148). As described previously, with MPEG a key frame appears at specified time intervals. In this step it is determined whether or not the acquired frame is a key frame.

If the result of determination in step S148 is that it is not a key frame processing returns to step S141, and the same cross filter image is combined with a newly acquired image for storage without creating a new cross filter image in step S127, to create a composite image for storage, and this composite image is stored in the external memory 114. A taken image that has been subjected to cross filter processing is converted to an image for display, and displayed on the display section 115.

On the other hand, if the result of determination in step S148 is that it is a key frame, processing returns to step S121. If processing returns to step S121, and if the cross filter mode is set, a new cross filter image for image composition is generated, and shooting of a movie continues.

Figure 15C:
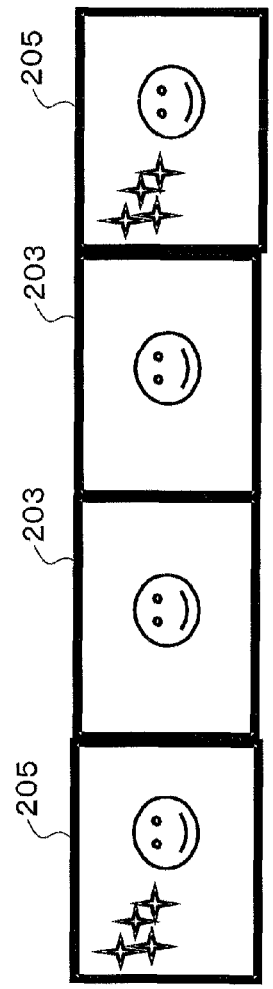

With this modified example, as shown in FIG. 15C, a key frame appears at specified time intervals, the composite image 205 is displayed and stored only for the key frame, and in the meantime only the frame image 203 is displayed and stored.

In this way, with the second modified example of the present invention, sophisticated use is made of the key frame, and cross filter processing is applied to the key frame. However, given MPEG encoding, the effect is provided on the key frame, it will be shown on other frames when the movie is played (decoded). Effect application flag management is therefore not necessary.

As has been described above, with the embodiment and modified examples of the embodiments of the present invention, bright spot detection regions are set for image data from an image sensor 107 (S45), bright spots within the bright spot detection regions are detected (S61), bright spot processing is performed at bright spot positions of the detected bright spots (S63), and an image that has been subjected to bright spot processing is displayed and stored (S51, S141). In this manner bright spot processing is not performed for the whole of an imaging region of the image sensor 107, and bright spot processing is performed only for bright spots within the bright spot detection regions. Cross filter processing appropriate to live view display and movies is therefore made possible.

With the embodiments and modified examples of the present invention, in the setting of effect application regions (bright spot detection regions), the imaging area was divided into 24 areas, and from among these 24 areas 4 areas were set. However, the number of divisions of the imaging area or the number of areas of the effect application region can be appropriately changed. It is possible to set the effect application region to the minimum size or greater in the horizontal and vertical directions. Also, the size of the areas is fixed, but it is also possible to change the size for each frame. Also, with the embodiments and modified examples of the present invention, setting of the effect application regions (bright spot detection regions) involved generating a random number and performing random setting, but it is also possible to sequentially select bright spot regions.

Also, with the embodiments and modified examples of the present invention, the number of bright spots processed in the set effect application regions (bright spot detection regions) is not limited, but it is also possible to limit the number of bright spots to be processed. By limiting the number of bright spots, it is possible to prevent processing time from becoming too long.

Also, with the embodiments of the present invention, cross filter processing to add lines of light centered on high brightness spots is applied as the bright spot processing. However, when a bright spot has been detected, besides cross filter processing it is possible to saturate (whiten) an area around the bright spot in a circle, or to apply other bright spot processing such as saturating in a star shape.

Further, with the embodiment and modified examples of the present invention, a device for taking pictures has been described using a digital camera, but as a camera it is also possible to use a digital single lens reflex camera or a compact digital camera, or a camera for movie use such as a video camera, and further to have a camera that is incorporated into a mobile phone, a mobile information terminal (PDA: Personal Digital Assistant), game console, etc.

While there have been shown and described what are considered to be preferred embodiments of the invention, it will, of course, be understood that various modifications and changes in form or detail could readily be made without departing from the spirit of the invention. It is therefore intended that the invention not be limited to the exact forms described and illustrated.

What is claimed is:

1. An imaging device comprising:
an imaging section for converting light from a subject to image signals and outputting image data defining a plurality of frames for display during a live view operation or for storage during a movie mode operation;
a bright spot region setting section for setting, within each frame of at least two of the plurality of frames, a bright spot region wherein a position or size of the bright spot region within each of the at least two of the plurality of frames is set at random and defines an area that is smaller than an area defined by each frame;
a bright spot detection section for detecting, for each frame of the at least two of the plurality of frames, bright spots only within the bright spot region set by the bright spot region setting section;
a bright spot processing section for performing bright spot processing at bright spot positions of the bright spots detected by the bright spot detection section; and
an image output section for outputting frames that have been subjected to bright spot processing by the bright spot processing section for display or for storage.

2. The imaging device of claim 1, further comprising:
a dramatic effect setting section for setting a processing method at the time of bright spot processing by the bright spot processing section.

3. The imaging device of claim 1, wherein:
the bright spot region setting section sets the bright spot region to a minimum size or greater in the horizontal and vertical directions.

4. The imaging device of claim 1, wherein:
the bright spot region setting section sequentially sets predetermined bright spot regions within each of the at least two of the plurality of frames.

5. The imaging device of claim 1, wherein:
bright spot processing of the bright spot processing section is cross filter processing.

6. The imaging device of claim 1, wherein:
the bright spot processing section switches any of at least one of partial brightness, cross length, color or size at the time of bright spot processing for consecutive frames of each of the at least two of the plurality of frames.

7. The imaging device of claim 1, wherein:
the bright spot processing section, when setting the bright spot region, sets a region that includes the same region in a plurality of frames at least once.

8. The imaging device of claim 1, wherein:
the bright spot processing section limits a number of bright spots that are processed within the set bright spot region.

9. The imaging device of claim 1, wherein:
the bright spot processing section processes every specified frame of the plurality of frames output from the image processing section.

10. The imaging device of claim 9, wherein:
the bright spot processing section, when processing every specified frame, generates a cross filter image that is separate from the acquired frame and outputs a composite image formed by combining this generated cross filter image with the acquired frame image, and when processing a frame that is not a specified frame, outputs an image using the acquired frame.

11. The imaging device of claim 1, wherein each of the plurality of frames corresponds to an entire imaging region of an image sensor of the imaging section, and
wherein the bright spot region is smaller than the frame of image data.

12. The imaging device of claim 1,
wherein the bright spot region setting section determines bright spot regions at different areas in different ones of the plurality of frames.

13. The imaging device of claim 1, wherein the random position or size is determined automatically.

14. A processor-executed imaging method, comprising:
converting light from a subject to image signals and outputting image data defining a plurality of frames for display during a live view operation or for storage during a movie mode operation;
setting, within each frame of at least two of the plurality of frames, a bright spot detection region wherein a position or size of the bright spot region within each of the at least two of the plurality of frames is set at random and defines an area that is smaller than an area defined by each frame;
detecting, for each frame of the at least two of the plurality of frames, bright spots only within the set bright spot detection region;
performing bright spot processing for bright spot positions of detected bright spots; and
outputting frames that have been subjected to the bright spot processing for display or for storage.

15. The processor-executed method of claim 14, wherein the act of converting a subject image to image signals and outputting image data in live view is performed by an image sensor, and
wherein the image data is a frame corresponding to an entire imaging region of the image sensor.

16. The processor-executed method of claim 14,
wherein the act of setting a bright spot detection region determines bright spot detection regions at different areas in different ones of the plurality of frames.

17. The processor-executed method of claim 14, wherein the random position or size is determined automatically.

* * * * *